(12) United States Patent
Palanivel et al.

(10) Patent No.: US 10,419,640 B1
(45) Date of Patent: Sep. 17, 2019

(54) TEXT ENHANCEMENT IN PRINTING MATERIAL SAVING MODE

(71) Applicant: XEROX CORPORATION, Norwalk, CT (US)

(72) Inventors: Dhevendra Alagan Palanivel, Chennai (IN); Sainarayanan Gopalakrishnan, Chennai (IN); Vignesh Doss, Palanichettipatti (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/009,606

(22) Filed: Jun. 15, 2018

(51) Int. Cl.
| | |
|---|---|
| *G06K 15/00* | (2006.01) |
| *H04N 1/407* | (2006.01) |
| *H04N 1/409* | (2006.01) |
| *G06T 7/12* | (2017.01) |

(52) U.S. Cl.
CPC ............ *H04N 1/4092* (2013.01); *G06T 7/12* (2017.01); *G06T 2207/20192* (2013.01)

(58) Field of Classification Search
CPC .................... H04N 1/4092; G06T 7/12; G06T 2207/20192
USPC ......................................... 358/3.27, 1.1, 1.9
See application file for complete search history.

(56) References Cited

U.S. PATENT DOCUMENTS

| | | | |
|---|---|---|---|
| 9,300,842 B1 * | 3/2016 | Schweid .............. | H04N 1/4092 |
| 2015/0302284 A1 * | 10/2015 | Ido ....................... | G03G 15/556 |
| | | | 358/1.9 |

* cited by examiner

*Primary Examiner* — Douglas Q Tran

(57) ABSTRACT

System(s) and method(s) for text enhancement in printing material saving mode are described. In an example, a method comprises identifying a type of a pixel based on edge tag data associated with the pixel, where the edge tag data is indicative of whether the pixel is an edge pixel or a non-edge pixel. The method further comprises determining at least one material saving parameter based on the type of the pixel. Further, the method comprises modifying a quantization error value based on the at least one material saving parameter. The method further comprises distributing the modified quantization error to a set of unprocessed pixels.

20 Claims, 4 Drawing Sheets

502

*DdGgMmNnTt*

*AaBbCcDdGg*

*nTtAaBbCcDdGgMmNnTt*

*GgMmNnTt*

*DdGgMmNnTt*

*AaBbCcDdGg*

*nTtAaBbCcDdGgMmNnTt*

*GgMmNnTt*

FIG. 5B

TEXT ENHANCEMENT IN PRINTING MATERIAL SAVING MODE

TECHNICAL FIELD

The present disclosure relates generally to the field of printing and/or copying, and, in particular, to methods and systems for text enhancement in printing material (ink or toner) saving mode.

BACKGROUND

In printing material saving mode or economy mode, a data stream, corresponding to an image which is to be printed, is processed prior to printing. As a result, less printing material (ink or toner) is used to print the image than it would if the processing was not performed.

More specifically, conventional digital reprographic systems operate by printing a series of dots or spots (pixels) of marking material on a recording medium to produce the rendered image. To reduce the amount of marking material used in rendering, conventionally black (non-white) regions in the image are modified to halftone grey regions. This is conventionally achieved by removing dots or spots (pixels) corresponding to marking material.

However, removing dots or spots (pixels) corresponding to marking material at the edges of text or shape can result in undesirable outcomes, such as jagged text or dithered lines. Thus, the text or shape that is printed may be of low quality, or low in legibility.

SUMMARY

This summary is provided to introduce concepts related to text enhancement in printing material saving mode. These concepts are further described below in the detailed description. This summary is not intended to identify essential features of the claimed subject matter nor is it intended for use in determining or limiting the scope of the claimed subject matter.

According to an embodiment of the present subject matter, a method for processing an image is described. The method includes identifying a type of a pixel of an image based on edge tag data associated with the pixel, where the edge tag data is indicative of whether the pixel is an edge pixel or a non-edge pixel. Based on the type of the pixel, at least one material saving parameter is determined. Thereafter, a quantization error is modified based on the at least one material saving parameter. The modified quantization error is then distributed to a set of unprocessed pixels for generating an output image with text enhancement with the at least one material saving parameter.

According to another embodiment of the present subject matter, an image processing system is described. The image processing system includes a processor and a material saving unit coupled to the processor. The material saving unit is provided to identify a type of a pixel of an image based on edge tag data associated with the pixel, where the edge tag data is indicative of whether the pixel is an edge pixel or a non-edge pixel. The material saving unit further is to determine at least one material saving parameter based on the type of the pixel. Further, the material saving unit is to modify a quantization error based on the at least one material saving parameter. The material saving unit is to distribute the quantization error to a set of unprocessed pixels, for generating an output image with text enhancement with the at least one material saving parameter.

According to another embodiment of the present subject matter, a multifunction device for processing an image is described. The multifunction device includes a processor to identify a type of a pixel of an image based on edge tag data associated with the pixel, where the edge tag data is indicative of whether the pixel is an edge pixel or a non-edge pixel. The processor further is to determine at least one material saving parameter based on the type of the pixel. Further, the processor is to modify a quantization error based on the at least one material saving parameter. Further, the processor is to distribute the quantization error to a set of unprocessed pixels, for generating an output image with text enhancement with the at least one material saving parameter.

According to yet another embodiment of the present subject matter, a multifunction device for processing an image is described. The multifunction device includes a processor to identify a type of a pixel of an image based on edge tag data associated with the pixel, where the edge tag data is indicative of whether the pixel is an edge pixel or a non-edge pixel. The processor further is to determine at least one material saving parameter based on the type of the pixel. Further, the processor is to modify a quantization error based on the at least one material saving parameter. Further, the processor is to distribute the quantization error to a set of unprocessed pixels, for generating an output image with text enhancement with the at least one material saving parameter. In an implementation, the processor modified the quantization error by ascertaining whether a pixel value of the pixel is lower than a threshold. On positive ascertainment, a black pixel is generated and at least one logical operation is performed based on an edge tag data to obtain inverted edge tag. Then, error diffusion is multiplied with a sum of multiplication of a first gain value by the edge tag and multiplication of a second gain value with the inverted edge tag (edge tag), so that different gains are applied for edge pixels and non-edge pixels.

Other and further aspects and features of the disclosure will be evident from reading the following detailed description of the embodiments, which are intended to illustrate, not limit, the present disclosure

BRIEF DESCRIPTION OF DRAWINGS

The illustrated embodiments of the subject matter will be best understood by reference to the drawings, wherein like parts are designated by like numerals throughout. The following description is intended only by way of example, and simply illustrates certain selected embodiments of devices, systems, and processes that are consistent with the subject matter as claimed herein.

FIGS. 5A and 5B show sample images according to embodiments of the present subject matter; and

DETAILED DESCRIPTION OF EMBODIMENTS

Figure 1:
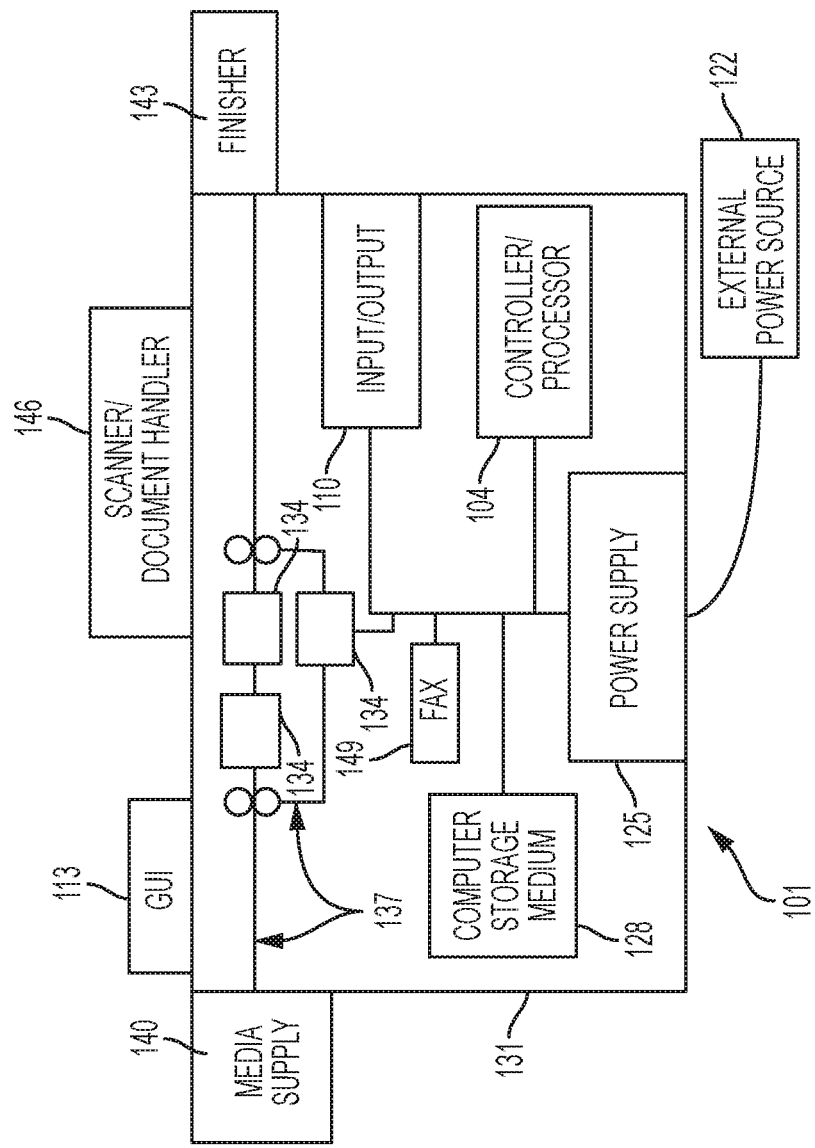
FIG. 1 is a side-view schematic diagram of a multifunction device according to systems and methods described herein.

A few inventive aspects of the disclosed embodiments are explained in detail below with reference to the various figures. Embodiments are described to illustrate the disclosed subject matter, not to limit its scope, which is defined by the claims. Those of ordinary skill in the art will recognize a number of equivalent variations of the various features provided in the description that follows.

Non-Limiting Definitions

Definitions of one or more terms that will be used in this disclosure are described below without limitations. For a person skilled in the art, it is understood that the definitions are provided just for the sake of clarity and are intended to include more examples than just provided below.

The term "multi-function device" refers to a device or a combination of multiple devices configured to perform one or more functions, but not limited to, scanning, printing, copying, imaging, and so forth. The multi-function device includes software, hardware, firmware, or combination thereof. In the context of the current disclosure, the multi-function device focuses on text enhancement in printing material saving mode.

The term "edge tag" refers to tags and/or other metadata or attributes identifying areas of an image which contain or represent edges, which can be detected by a variety of techniques, including the identification of high-contrast regions of the subject image, and/or others.

The term "black pixel" refers to a pixel with printing material or a pixel having a black dot in that spot.

The term "white pixel" refers to a pixel without ink or an absence of the black dot in that spot. A binary image is formed by the combination of the black pixels and the white pixels.

The term "pixel value" refers to a "contone value" (on a continuous grayscale from white to black).

The term "gain value" refers to a numeric value indicative of the rate of consumption of printing material. The gain value has to be greater than 1 for printing material saving. The gain value is controlled to control a rate of consumption of the printing material for material saving.

The term "printing material saving" or "material saving" refers to saving of consumption of the material for a printing operation in comparison to consumption of the printing material for the same printing operation without the application of present disclosure.

The term "printing material" refers to any marking material or colorant used in digital printing. The marking material may include ink as used in an inkjet context and may include toner as used in a xerographic context.

The present subject matter is described hereinafter by reference to a multi-function device that includes a print engine having a digital image processor. While the disclosure will be described hereinafter in connection with specific systems and methods thereof, it will be understood that limiting the disclosure to such specific systems and methods is not intended. On the contrary, it is intended to cover all alternatives, modifications, and equivalents as may be included within the spirit and scope of the disclosure as defined by the appended claims.

Exemplary Embodiments

According to an embodiment of the present subject matter, a method for processing an image is described. The method includes identifying a type of a pixel of an image based on edge tag data associated with the pixel, where the edge tag data is indicative of whether the pixel is an edge pixel or a non-edge pixel. Based on the type of the pixel, at least one material saving parameter is determined. Thereafter, a quantization error is modified based on the at least one material saving parameter. The modified quantization error is then distributed to a set of unprocessed pixels for generating an output image with text enhancement with the at least one material saving parameter.

The method includes: obtaining image data associated with the image, the image data comprising information associated with a plurality of pixels of the image; and applying a segmentation technique on the image data to generate the edge tag data associated with each of the plurality of pixels.

The material saving parameter includes a gain value associated with each pixel.

The method includes: ascertaining whether a pixel value of the pixel is lower than a threshold; on positive ascertainment, generating a black pixel and performing at least one logical operation based on the edge tag data to obtain inverted edge tag; and multiplying an error diffusion with a sum of multiplication of a first gain value by the edge tag and multiplication of a second gain value with the inverted edge tag.

The method includes: ascertaining whether a pixel value of the pixel is higher than a threshold value; and on positive ascertainment, generating a white pixel and diffusing the quantization error to the set of unprocessed neighboring pixels.

The method further includes determining a first material saving parameter and a second material saving parameter based on the identified type of the pixel, wherein the first material saving parameter is less than equal to the second material saving parameter.

According to another embodiment of the present subject matter, an image processing system is described. The image processing system includes a processor and a material saving unit coupled to the processor. The material saving unit is provided to identify a type of a pixel of an image based on edge tag data associated with the pixel, where the edge tag data is indicative of whether the pixel is an edge pixel or a non-edge pixel. The material saving unit further is to determine at least one material saving parameter based on the type of the pixel. Further, the material saving unit is to modify a quantization error based on the at least one material saving parameter. The material saving unit is to distribute the quantization error to a set of unprocessed pixels, for generating an output image with text enhancement with the at least one material saving parameter.

The image processing system further includes a segmenting unit, coupled to the processor, to: obtain image data associated with the image, the image data comprising information associated with a plurality of pixels of the image; and apply a segmentation technique on the image data to generate the edge tag data associated with each of the plurality of pixels.

The material saving parameter is a gain value associated with each pixel.

The material saving unit modifies the quantization error by: ascertaining whether a pixel value of the pixel is lower than a threshold; on positive ascertainment, generating a black pixel and performing at least one logical operation based on the edge tag data to obtain inverted edge tag; and multiplying an error diffusion with a sum of multiplication of a first gain value by the edge tag and multiplication of a second gain value with the inverted edge tag.

The material saving unit is to: ascertain whether a pixel value of the pixel is higher than a threshold value; and on positive ascertainment, generate a white pixel and diffuse the quantization error to the set of unprocessed neighboring pixels.

The material saving unit further is to determine a first material saving parameter and a second material saving parameter based on the type of the pixel, wherein the first material saving parameter is less than or equal to the second material saving parameter.

According to another embodiment of the present subject matter, a multifunction device for processing an image is described. The multifunction device includes a processor to identify a type of a pixel of an image based on edge tag data associated with the pixel, where the edge tag data is indicative of whether the pixel is an edge pixel or a non-edge pixel. The processor further is to determine at least one material saving parameter based on the type of the pixel. Further, the processor is to modify a quantization error based on the at least one material saving parameter. Further, the processor is to distribute the quantization error to a set of unprocessed pixels, for generating an output image with text enhancement with the at least one material saving parameter.

The processor is to: obtain image data associated with the image, the image data comprising information associated with a plurality of pixels of the image; and apply a segmentation technique on the image data to generate the edge tag data associated with each of the plurality of pixels.

The material saving parameter is a gain value associated with each pixel.

The processor modifies the quantization error by: ascertaining whether a pixel value of the pixel is lower than a threshold; on positive ascertainment, generating a black pixel and performing at least one logical operation based on the edge tag data to obtain inverted edge tag; and multiplying an error diffusion with a sum of multiplication of a first gain value by the edge tag and multiplication of a second gain value with the inverted edge tag.

The processor is to: ascertain whether a pixel value of the pixel is higher than a threshold value; and on positive ascertainment, generate a white pixel and diffuse the quantization error to the set of unprocessed neighboring pixels.

The processor further is to determine a first material saving parameter and a second material saving parameter based on the type of the pixel, wherein the first material saving parameter is less than or equal to the second material saving parameter.

According to yet another embodiment of the present subject matter, a multifunction device for processing an image is described. The multifunction device includes a processor to identify a type of a pixel of an image based on edge tag data associated with the pixel, where the edge tag data is indicative of whether the pixel is an edge pixel or a non-edge pixel. The processor further is to determine at least one material saving parameter based on the type of the pixel. Further, the processor is to modify a quantization error based on the at least one material saving parameter. Further, the processor is to distribute the quantization error to a set of unprocessed pixels, for generating an output image with text enhancement with the at least one material saving parameter. In an implementation, the processor modifies the quantization error by ascertaining whether a pixel value of the pixel is lower than a threshold. On positive ascertainment, a black pixel is generated and at least one logical operation is performed based on an edge tag data to obtain inverted edge tag. Then, error diffusion is multiplied with a sum of multiplication of a first gain value by the edge tag and multiplication of a second gain value with the inverted edge tag (edge tag), so that different gains are applied for edge pixels and non-edge pixels.

The processor is to: ascertain whether a pixel value of the pixel is higher than a threshold value; and on positive ascertainment, generate a white pixel and diffuse the quantization error to the set of unprocessed neighboring pixels.

FIG. 1 illustrates a multi-function device 101, according to one or more embodiments of the present disclosure. The multi-function device 101 may be used with systems and methods herein. In one embodiment, the multi-function device 101 may be a printer, a copier, and a fax machine. In one embodiment, the multi-function device 101 may be a special purpose machine that includes a specialized image processing card having unique Application Specific Integrated Circuits (ASIC) for providing printing material saving instructions. The multi-function device 101 may also include specialized boards having unique ASICs for input and output devices for faster network communications processing, and a specialized ASIC processor that performs the logic of the methods described herein using dedicated unique hardware logic circuits.

In one embodiment, the multi-function device 101 may include a controller/processor 104 and an input/output device 110 operatively connected to the controller/processor 104. The input/output device 110 may be used for communications to and from the multi-function device 101. Further, the controller/processor 104 may control various actions of the multi-function device 101. In one embodiment, a non-transitory computer storage medium 128 is readable by the controller/processor 104 and may store instructions that the controller/processor 104 executes to allow the multi-function device 101 to perform the various functions, such as those described herein. The non-transitory computer storage medium 128 may be optical, magnetic, and capacitor-based.

According to systems and methods herein, the controller/processor 104 may include a special purpose processor and a dedicated processor. The special purpose processor may be specialized for processing image data. Further, the dedicated processor may include ASICs that are specialized for the handling of printing material saving operations, processing image data, and calculating pixel values.

In one embodiment, the controller/processor 104 may include a Raster Image Processor (RIP). The RIP may use an original image description to RIP a print job. Accordingly, print instruction data may be converted to a printer-readable language. Further, a print job description is generally used to generate a ready-to-print file. In one example, the ready-to-print file may be a compressed file that may be repeatedly accessed for multiple passes.

In one embodiment, the multi-function device 101 may also include at least one accessory functional component, such as a graphic user interface assembly (GUI) 113. The GUI 113 may operate on power supplied from an external power source 122 which may provide electrical power through a power supply 125. In one embodiment, the external power source 122 may include, but not limited to, an alternating current (AC) power source. Further, the power supply 125 may include a power storage element, for example, a battery. The power supply 125 may convert external power into the type of power needed by the various components of the multi-function device 101. In one embodiment, a device housing 131 has one or more functional components that operate on the power supplied from the external power source 122.

The multi-function device 101 may include at least one marking device 134, also referred to as printing engines, operatively connected to the controller/processor 104, and a media path 137 positioned to supply sheets of media from a media supply 140 to the marking device(s) 134 along the media path 137. After receiving various markings from the printing engine(s), the sheets of media may optionally pass to a finisher 143 which may fold, staple, and sort various printed sheets. In addition, the multi-function device 101 may include at least one accessory functional component, such as a scanner/document handler 146 and fax module 149 that also operates on the power supplied from the external power source 122 through the power supply 125. The fax module 149 may operate in conjunction with the scanner/document handler 146.

The scanner/document handler 146 may be an image input device capable of obtaining information from an image. The image input device may include, but not limited to, a digital document device, a computer system, a memory and storage device, a networked platform, for example, servers and client devices which can obtain pixel values from a source device, and an image capture device. The image capture device may further include, but not limited to, a scanner, a camera, photography equipment, a facsimile machine, photo reproduction equipment, a digital printing press, and a xerographic device.

As is generally known, the scanner is an image capture device that optically scans images and print media and converts the scanned image into a digitized format. Common scanning devices may include variations of a flatbed scanner, wherein specialized image receptors move beneath a platen and scan the media placed on the platen. On the other hand, modern digital scanners typically incorporate a charge-coupled device (CCD) or a contact image sensor (CIS) as an image sensing receptor(s). The scanning device may produce a signal of scanned image data. Such a digital signal may contain information about pixels, such as color value, intensity, and their location within the scanned image.

Further, an image output device is any device capable of rendering the image. In one embodiment, the image output device may include, but is not limited to, digital document reproduction equipment and other copier systems as are widely known in commerce, photographic production and reproduction equipment, monitors and other displays, and computer workstations and servers, including a wide variety of color marking devices.

In one embodiment, rendering an image may include reducing the image data or a signal thereof to a viewable form, store the image data to memory or a storage device for subsequent retrieval, and communicate the image data to another device. Such communication may take the form of transmitting a digital signal of the image data over a network.

As would be understood by those ordinarily skilled in the art, the multi-function device 101 shown in FIG. 1 is merely exemplary, and the systems and methods herein are equally applicable to other types of printing devices that may include fewer components or more components, without departing from the scope of the present disclosure.

Figure 2:
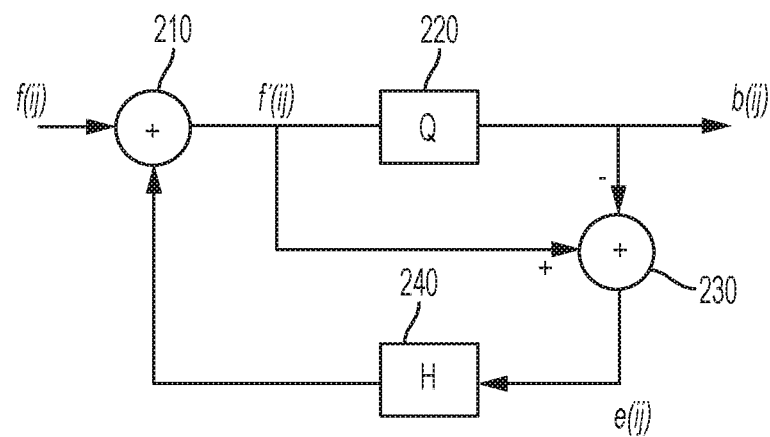
FIG. 2 shows a block diagram of a conventional error diffusion process.

FIG. 2 illustrates a conventional error diffusion process for saving printing material when a device, such as the multifunction device 101, is operated in a printing material saving mode. Generally, an image F=f(i, j) is an N×M two-dimensional matrix of pixels taking real intensities number in the range [0, 1] (1≤i≤N 1≤j≤M). A binary image B=b(i, j) is a two-dimensional matrix of pixels taking a binary value 0 (black) or 1 (white). It is to be noted that the binary value may be 1 (black) or 0 (white). The actual binary value representation depends upon whether the printing device is a write black printing device or a write white printing device.

As can be appreciated by those skilled in the art, error diffusion is designed to preserve the average intensity level between input and output images by propagating the quantization error to unprocessed neighboring pixels according to some fixed ratios (weighting coefficients). Accordingly, in error diffusion, the pixel values b(i, j) of the binary image is determined in raster scan order. These values of b(i, j) may be determined by simply thresholding as follows:

$$b(i, j) = \begin{cases} 0, & \text{if } f(i, j) \leq 1/2 \\ 1, & \text{if } f(i, j) > 1/2 \end{cases} \quad (1)$$

The quantization error, represented as e(i, j), is computed by:

$$e(i,j) = f(i,j) - b(i,j) \quad (2)$$

The conventional error diffusion process selects the pixel values of a binary image which minimize the absolute value of error |e(i, j)|, and then distributes the weighted error to a set of unprocessed pixels, as shown below.

$$f(i+k, j+l) \leftarrow f(i+k, j+l) + h(k,l) \cdot e(i,j) \quad (3)$$

As illustrated in FIG. 2, a gray scale image data value {circumflex over (f)}(i, j) is converted (quantized) to a binary image data value b(i, j) by a quantization circuit 220. Those skilled in the art can appreciate that although this example is provided with reference to gray scale image data, but it is equally applicable to the colored image data. Accordingly, the present subject matter is equally applicable to both color and gray scale images.

The binary image data value b(i, j) and the gray scale image data value {circumflex over (f)}(i, j) are received by an error generation circuit 230 to generate the quantization error e(i, j). The error generation circuit (Q) 230 may be an adder which determines the absolute difference between the binary image data value b(i, j) and the gray scale image data value {circumflex over (f)}(i, j)

The quantization error e(i, j) is received by a diffusion circuit (H) 240 which diffuses the quantization error e(i, j) to adjacent pixels based upon a set of predetermined weighting coefficients. As illustrated the initial gray scale image data value f(i, j) is modified based upon adding a quantization error received from the diffusion circuit (H) 240 to the initial gray scale image data value f(i, j) at adder 210 to generate {circumflex over (f)}(i, j).

Once the input image is converted to binary, by way of additional processing, printing material saving may be achieved. However, as a result of operating the device in the printing material saving mode, the text becomes light in intensity. In certain examples where a sharp image is desired, such print quality may not be acceptable to a user.

Figure 3:
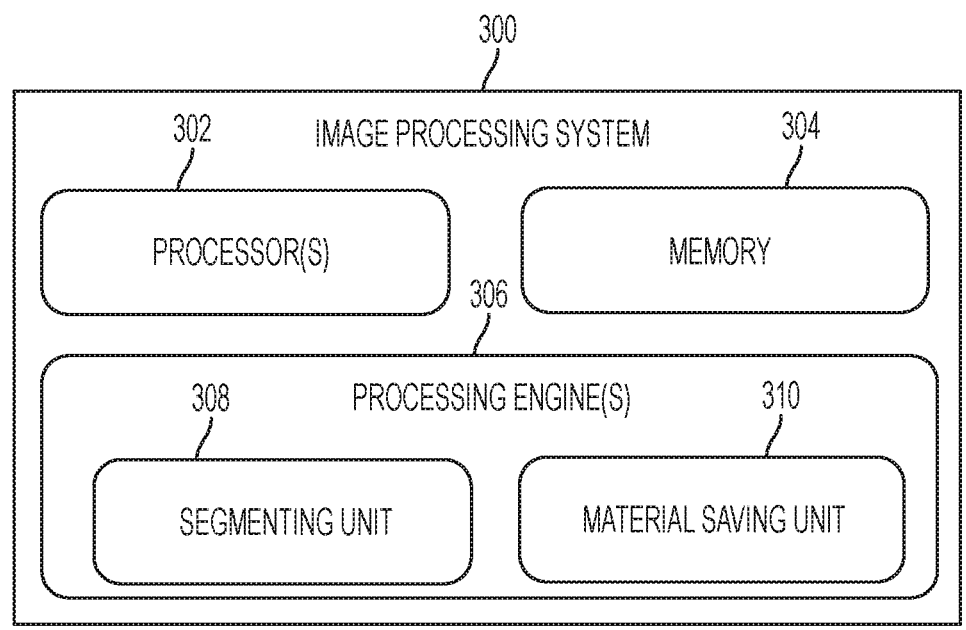
FIG. 3 shows a system according to an embodiment of the present subject matter.

FIG. 3 illustrates an image processing system 300, interchangeably referred to as a system 300, according to an embodiment of the present subject matter. The system 300 may be implemented in devices, such as the multifunction device 100, as described above in FIG. 1. According to principles of the present subject matter, the system 300 operates in the printing material saving mode in a manner such that legibility of the text is preserved and/or enhanced.

The system 300 may include one or more processor(s) 302. The one or more processor(s) 302 may be implemented as one or more microprocessors, microcomputers, microcontrollers, digital signal processors, central processing units, logic circuitries, and/or any devices that manipulate data based on operational instructions. Among other capabilities, the one or more processor(s) 302 are configured to fetch and execute computer-readable instructions stored in a memory 304 of the system 300. The memory 304 may store one or more computer-readable instructions or routines, which may be fetched and executed to generate an output image. The memory 304 may include any non-transitory storage device including, for example, volatile memory such as RAM, or non-volatile memory such as EPROM, flash memory, and the like.

The system 300 may also include an interface(s) (not shown in figures). The interface(s) may include a variety of interfaces, for example, interfaces for data input and output devices, referred to as I/O devices, storage devices, and the like. The interface(s) may facilitate communication of the system 300 with various devices coupled to the system 300. The interface(s) may also provide a communication pathway for one or more components of the system 300. Examples of such components include, but are not limited to, processing engine(s) 306.

The processing engine(s) 306 may be implemented as a combination of hardware and programming (e.g., programmable instructions) to implement one or more functionalities of the processing engine(s) 306. In examples described herein, such combinations of hardware and programming may be implemented in several different ways. For example, the programming for the processing engine(s) 306 may be processor executable instructions stored on a non-transitory machine-readable storage medium and the hardware for the processing engine(s) 306 may include a processing resource (e.g., one or more processors), to execute such instructions. In the present examples, the machine-readable storage medium may store instructions that, when executed by the processing resource, implement the processing engine(s) 306. In such examples, the system 300 may include the machine-readable storage medium storing the instructions and the processing resource to execute the instructions, or the machine-readable storage medium may be separate but accessible to system 300 and the processing resource. In other examples, the processing engine(s) 306 may be implemented by electronic circuitry.

In an aspect, the processing engine(s) 306 may include a segmenting unit 308 and a material saving unit 310. In an example, the segmenting unit 308 and the material saving unit 310 may be implemented as one or more microprocessors, microcomputers, microcontrollers, digital signal processors, central processing units, state machines, logic circuitries, configurable hardware units, and/or any devices that manipulate signals based on operational instructions. Among other capabilities, the segmenting unit 308 and the material saving unit 310 are configured to fetch and execute computer-readable instructions and data stored in a storage unit (not shown in the figure).

In operation, the segmenting unit 308 obtains image data associated with an image which is to be printed. The image data may be stored in an internal storage of a device in which the system 300 is implemented. In another example, the image data may be obtained from an external storage device communicatively coupled with a device in which the system 300 is implemented. In yet another example, where the device including the system 300 is implemented in a network of computing devices, the image data may be obtained from a computing device present in the network.

The image data may include information associated with a plurality of pixels of the image. On obtaining the image data, the segmenting unit 308 applies a segmentation technique to the image data to generate edge tag data associated with each of the plurality of pixels. The edge tag data may be understood as data indicative of whether a pixel is an edge pixel or a non-edge pixel.

In an embodiment, the material saving unit 310 is to process the plurality of pixels prior to printing the image. In said embodiment, the material saving unit 310 implements the error diffusion process as described herein, with reference to FIG. 3. According to the embodiment, the material saving unit 310 compares a pixel value of a pixel with a threshold value. In the case where the material saving unit 310 determines the pixel value to be greater than the threshold value, a white pixel is generated as output and the error is diffused to neighboring pixels. In an example, a user, for example, an administrator, may select a level of halftoning. Accordingly, the level of the threshold may be adjusted by the material saving unit 310.

In another example where the material saving unit 310 determines the pixel value to be lower than the threshold value, the material saving unit 310 identifies a type of the pixel based on the edge tag data associated with the pixel. As mentioned above, the edge tag data is indicative of whether the pixel is an edge pixel or a non-edge pixel.

Based on the type of the pixel, the material saving unit 310 determines at least one material saving parameter. The at least one material saving parameter may be, for example, gain or gain value. In an example, when the gain is above a predefined value, printing material saving is enhanced. For instance, when the gain is equal to one, printing material saving does not occur. Accordingly, as the value of gain increases more than one, printing material saving is increased.

In an example where the pixel is an edge pixel, the material saving unit 310 determines a material saving gain A. In another example, where the pixel is a non-edge pixel, the material saving unit 310 determines a material saving gain B. In an example, the material saving unit 310 determines the A and B such that A is lesser in value B. That is, printing material saving determined for an edge pixel is lesser in value than a material saving gain which is determined for a non-edge pixel. As a result, print quality or legibility of edge pixels is higher than that of non-edge pixels.

In an example, the material saving unit 310 determines a first material saving parameter (g1=1) and a second material saving parameter (g2=3) such that the first material saving parameter is less than or equal to the second material saving parameter.

Subsequently, the material saving unit 310 modifies a quantization error based on the at least one material saving parameter. In an example, for modifying the quantization error, the material saving unit 310 uses the edge tag associated with the pixel. In said example, the material saving unit 310 modifies or computes the quantization error as shown in the below equation:

$$e_T(i, j) = \begin{cases} (G1 * edgetag + G2 * (\sim edgetag)) * (f(i, j) - b(i, j)), & \text{if } f(i, j) \leq 1/2 \\ f(i, j) - b(i, j), & \text{if } f(i, j) > 1/2 \end{cases} \quad (4)$$

where
   $e_T(i,j)$ is the modified quantization error,
   G1 is the first material saving parameter, and
   G2 is the second material saving parameter.

In an example, for modifying the quantization error, the material saving unit 310 performs at least one logical operation on the edge tag to obtain an inverted edge tag. As can be seen in the equation (4) above, for modifying/computing the quantization error $e(i, j)$, the material saving unit 310 multiplies the error $((f(i,j)-b(i,j)))$ with the sum of multiplication of first material saving gain with the edge tag and multiplication of the second material saving gain with the inverted edge tag (~edge tag). As a result, different gains are applied for edge pixels and non-edge pixels. Those skilled in the art can appreciate that it would not be obvious to introduce gain based on conditions or thresholding as presented in equation (4).

In brief, in case the material saving unit 310 determines the pixel value to be lower than the threshold value, the material saving unit 310 generates a black pixel and multiplies the error by gain before being diffused to neighborhood pixels.

After modifying the quantization error $e(i,j)$ as described above, the material saving unit 310 distributes the modified quantization error $e_T(i,j)$ to a set of unprocessed pixels. In an example, the set of unprocessed pixels include the other pixels in the plurality of pixels included in the image data.

As may be gathered from the above description, aspects of the present subject matter provide for improved legibility and sharpness of text in material saving mode. As described above, the gain is adjusted based on a type of the pixel. For edge pixels, the gain is kept lower than the gain of non-edge pixels. Lower gain results in the lower material saving when processing edge pixels and thus, the edge pixels become more legible and sharp in comparison to non-edge pixels. Thus, principles of the present subject matter facilitate in improving the legibility of text, or text enhancement.

Figure 4:
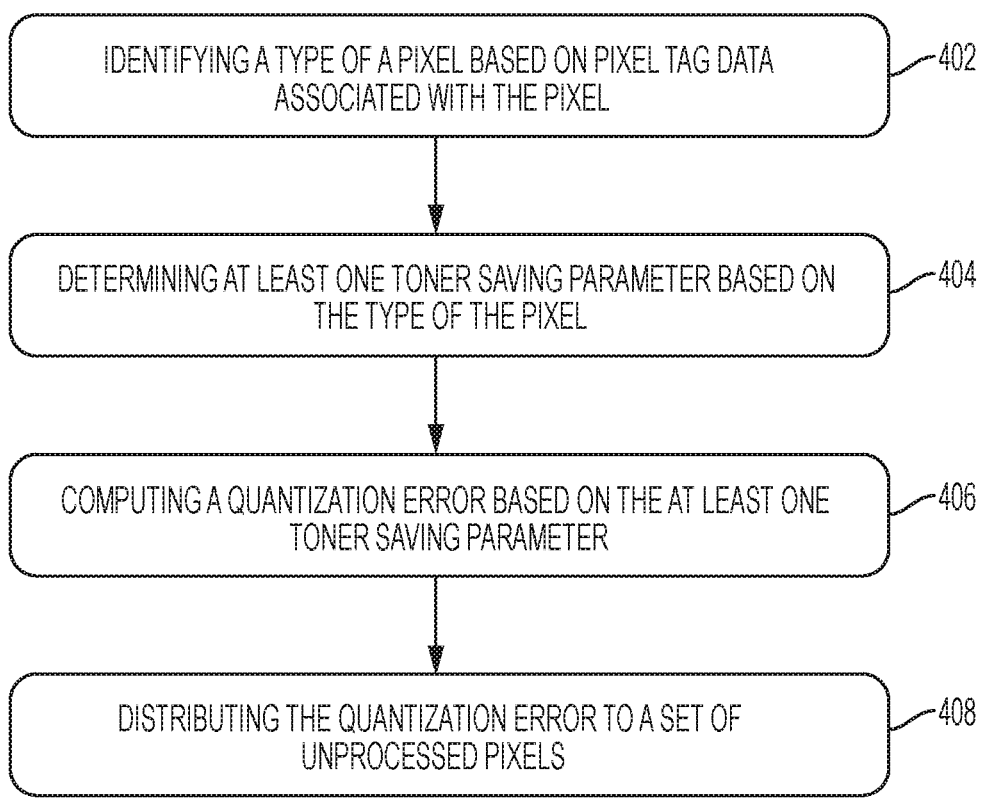
FIG. 4 shows an exemplary method according to an embodiment of the present subject matter.

FIG. 4 illustrates an exemplary method 400 for text enhancement in material saving mode, according to an embodiment of the present subject matter. The order in which the steps of method 400 are described is not intended to be construed as a limitation, and any number of the described method blocks can be combined in any order to implement method 400, or an alternative method. Additionally, individual blocks may be deleted from the method 400 without departing from the spirit and scope of the subject matter described herein. Furthermore, the method 400 may be implemented in any suitable hardware, machine-readable instructions, firmware, or combination thereof.

A person skilled in the art will readily recognize that steps of the method 400 can be performed by programmed computers. Herein, some examples are also intended to cover program storage devices and non-transitory computer-readable medium, for example, digital data storage media, which are machine or computer readable and encode machine-executable or computer-executable instructions, where said instructions perform some or all of the steps of the described method 400. The program storage devices may be, for example, digital memories, magnetic storage media, such as magnetic disks and magnetic tapes, hard drives, or optically readable digital, data storage media.

Referring to FIG. 4, at 402, a type of a pixel is identified based on edge tag data associated with the pixel. The type of pixel, or the pixel, may be one of an edge pixel and a non-edge pixel. In an example, the material saving unit 310 may identify the type of the pixel based on the edge tag data.

At 404, at least one material saving parameter is determined based on a type of the pixel. In an example, the material saving parameter is gain. In a case where the pixel is an edge pixel, lesser value of material saving gain is determined in comparison to a case where the pixel is a non-edge pixel. In an example, the material saving unit 310 determines the at least one material saving parameter based on the type of the pixel.

At 406, a quantization error is computed based on the at least one material saving parameter. The quantization error is computed by ascertaining whether a pixel value of the pixel is lower than a threshold. On positive ascertainment, a black pixel is generated and at least one logical operation is performed based on an edge tag data to obtain inverted edge tag. Then, error diffusion is multiplied with a sum of multiplication of a first gain value by the edge tag and multiplication of a second gain value with the inverted edge tag (edge tag), so that different gains are applied for edge pixels and non-edge pixels.

At 408, the modified quantization error $e_T(i,j)$ is distributed to a set of unprocessed pixels. In an example, the material saving unit 310 may distribute the modified quantization error $e_T(i, j)$ to the set of unprocessed pixels.

FIGS. 5A-5B illustrate a comparative analysis of a sample original grey image and a material saving image obtained with the methods as described herein in accordance with the present subject matter. Referring to FIG. 5A, an original grey image 502 is shown. Referring to FIG. 5B, an image 504, as processed using digital image processing methods in accordance with the present subject matter is shown.

Described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims—and their equivalents—in which all terms are meant in their broadest reasonable sense unless otherwise indicated.

For a person skilled in the art, it is understood that the use of phrase(s) "is", "are", "may", "can", "could", "will", "should" or the like is for understanding various embodiments of the present disclosure and the phrases do not limit the disclosure or its implementation in any manner.

It is emphasized that the term "comprises" or "comprising" is used in this specification to specify the presence of stated features, integers, steps or components, but does not preclude the addition of one or more further features, integers, steps or components, or groups thereof.

The order in which the method is described is not intended to be construed as a limitation, and any number of the described method blocks can be combined in any order to implement the method or alternate methods. Additionally, individual blocks may be deleted from the method without departing from the spirit and scope of the subject matter described herein. Furthermore, the method can be implemented in any suitable hardware, software, firmware, or combination thereof. However, for ease of explanation, in the embodiments described below, the method may be considered to be implemented in the above-described system and/or the apparatus and/or any electronic device (not shown).

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

Note that throughout the aforementioned discussion, numerous references may be made regarding servers, services, engines, modules, interfaces, portals, platforms, or other systems formed from computing devices. It should be appreciated that the use of such terms are deemed to represent one or more computing devices having at least one processor configured to or programmed to execute software instructions stored on a computer-readable tangible, non-transitory medium or also referred to as a processor-readable medium. For example, a server can include one or more computers operating as a web server, database server, or another type of computer server in a manner to fulfill described roles, responsibilities, or functions. Within the context of this document, the disclosed devices or systems are also deemed to comprise computing devices having a processor and a non-transitory memory storing instructions executable by the processor that cause the device to control, manage, or otherwise manipulate the features of the devices or systems.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "computing," or "determining," or "distributing," or "identifying," or "multiplying," "or "ascertaining," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

The methods illustrated throughout the specification may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The terminology used herein is for the purpose of describing particular embodiments only and is not intended to be limiting of the disclosure. It will be appreciated that several of the above-disclosed and other features and functions, or alternatives thereof, may be combined into other systems or applications. Various presently unforeseen or unanticipated alternatives, modifications, variations, or improvements therein may subsequently be made by those skilled in the art without departing from the scope of the present disclosure as encompassed by the following claims.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method of processing an image to generate an output image with text enhancement, comprising:
    identifying, by a processor, a type of a pixel in the image based on edge tag data associated with the pixel, wherein the edge tag data is indicative of whether the pixel is an edge pixel or a non-edge pixel;
    determining, by the processor, at least one material saving parameter based on the type of the pixel;
    computing a quantization error based on the at least one material saving parameter; and distributing, by the processor, the quantization error to a set of unprocessed pixels for generating the output image with text enhancement with the at least one material saving parameter such that print quality of the image is enhanced.

2. The method as claimed in claim 1, further comprising:
obtaining image data associated with the image, the image data comprising information associated with a plurality of pixels of the image; and
applying a segmentation technique on the image data to generate the edge tag data associated with each of the plurality of pixels.

3. The method as claimed in claim 1, wherein the material saving parameter includes a gain value associated with each pixel.

4. The method as claimed in claim 3, further comprises:
ascertaining whether a pixel value of the pixel is lower than a threshold;
on positive ascertainment, generating a black pixel and performing at least one logical operation based on the edge tag data to obtain inverted edge tag; and
multiplying an error diffusion with a sum of multiplication of a first gain value by the edge tag and multiplication of a second gain value with the inverted edge tag.

5. The method as claimed in claim 1, further comprising:
ascertaining whether a pixel value of the pixel is higher than a threshold value; and
on positive ascertainment, generating a white pixel and diffusing the quantization error to the set of unprocessed neighboring pixels.

6. The method as claimed in claim 1, further comprising determining a first material saving parameter and a second material saving parameter based on the identified type of the pixel, wherein the first material saving parameter is less than equal to the second material saving parameter.

7. An image processing system for processing an image to generate an output image with text enhancement comprising:
a processor;
a material saving unit, coupled to the processor, to:
identify a type of a pixel of the image based on edge tag data associated with the pixel, wherein the edge tag data is indicative of whether the pixel is an edge pixel or a non-edge pixel;
determine at least one material saving parameter based on the type of the pixel;
modify a quantization error based on the at least one material saving parameter; and
distribute the modified quantization error to a set of unprocessed pixels, for generating the output image with text enhancement with the at least one material saving parameter.

8. The image processing system as claimed in claim 7, further comprising a segmenting unit, coupled to the processor, to:
obtain image data associated with the image, the image data comprising information associated with a plurality of pixels of the image; and
apply a segmentation technique on the image data to generate the edge tag data associated with each of the plurality of pixels.

9. The image processing system as claimed in claim 7, wherein the material saving parameter is a gain value associated with each pixel.

10. The image processing system as claimed in claim 7, wherein the material saving unit modifies the quantization error by:
ascertaining whether a pixel value of the pixel is lower than a threshold;
on positive ascertainment, generating a black pixel and performing at least one logical operation based on the edge tag data to obtain inverted edge tag; and
multiplying an error diffusion with a sum of multiplication of a first gain value by the edge tag and multiplication of a second gain value with the inverted edge tag.

11. The image processing system as claimed in claim 7, wherein the material saving unit is to:
ascertain whether a pixel value of the pixel is higher than a threshold value; and
on positive ascertainment, generate a white pixel and diffuse the quantization error to the set of unprocessed neighboring pixels.

12. The image processing system as claimed in claim 7, wherein the material saving unit further is to determine a first material saving parameter and a second material saving parameter based on the type of the pixel, wherein the first material saving parameter is less than or equal to the second material saving parameter.

13. A multifunction device for processing an image to generate an output image with text enhancement, comprising:
a processor to:
identify a type of a pixel of the image based on edge tag data associated with the pixel, wherein the edge tag data is indicative of whether the pixel is an edge pixel or a non-edge pixel;
determine at least one material saving parameter based on the type of the pixel;
modify a quantization error based on the at least one material saving parameter; and
distribute the quantization error to a set of unprocessed neighboring pixels, for generating the output image with text enhancement with the at least one material saving parameter.

14. The multifunction device as claimed in claim 13, wherein the processor is to:
obtain image data associated with the image, the image data comprising information associated with a plurality of pixels of the image; and
apply a segmentation technique on the image data to generate the edge tag data associated with each of the plurality of pixels.

15. The multifunction device as claimed in claim 13, wherein the material saving parameter is a gain value associated with each pixel.

16. The multifunction device as claimed in claim 13, wherein the processor modifies the quantization error by:
ascertaining whether a pixel value of the pixel is lower than a threshold;
on positive ascertainment, generating a black pixel and performing at least one logical operation based on the edge tag data to obtain inverted edge tag; and
multiplying an error diffusion with a sum of multiplication of a first gain value by the edge tag and multiplication of a second gain value with the inverted edge tag.

17. The multifunction device as claimed in claim 13, wherein the processor is to:
ascertain whether a pixel value of the pixel is higher than a threshold value; and on positive ascertainment, generate a white pixel and diffuse the quantization error to the set of unprocessed neighboring pixels.

18. The multifunction device as claimed in claim 13, wherein the processor further is to determine a first material saving parameter and a second material saving parameter based on the type of the pixel, wherein the first material saving parameter is less than or equal to the second material saving parameter.

19. A multifunction device for processing an image to generate an output image with text enhancement, comprising:
a processor to:
identify a type of a pixel of the image based on edge tag data associated with the pixel, wherein the edge tag data is indicative of whether the pixel is an edge pixel or a non-edge pixel;
determine at least one material saving parameter based on the type of the pixel;
modify a quantization error based on the at least one material saving parameter, wherein the processor modifies the quantization error by:
ascertaining whether a pixel value of the pixel is lower than a threshold;
on positive ascertainment, generating a black pixel and performing at least one logical operation based on the edge tag data to obtain inverted edge tag; and
multiplying an error diffusion with a sum of multiplication of a first gain value by the edge tag and multiplication of a second gain value with the inverted edge tag; and
distribute the quantization error to a set of unprocessed neighboring pixels, for generating the output image with text enhancement with the at least one material saving parameter.

20. The multifunction device as claimed in claim 19, wherein the processor is to:
ascertain whether a pixel value of the pixel is higher than a threshold value; and
on positive ascertainment, generate a white pixel and diffuse the quantization error to the set of unprocessed neighboring pixels.

* * * * *